United States Patent

[11] 3,549,105

[72] Inventors Wolf Freiherr Von Hornstein
Ottostr. 4a, and
Albert Liebl, Am Muehleich 12, 813
Starnberg, Germany

[21] Appl. No. 750,151
[22] Filed Aug. 5, 1968
[45] Patented Dec. 22, 1970
[32] Priority Aug. 24, 1967
[33] Germany
[31] No. 1,549,042

[54] TAPE TENSION CONTROL SYSTEM WITH SENSING LEVERS, PARTICULARLY FOR MAGNETIC SOUND RECORDERS
5 Claims, 4 Drawing Figs.

[52] U.S. Cl. .......... 242/210
[51] Int. Cl. .......... B65h 75/34; G03b 1/04; G11b 15/60
[50] Field of Search .......... 242/75.3, 186—189, 210; 318/6, 7; 226/195

[56] References Cited
UNITED STATES PATENTS
3,311,280 3/1967 Larson et al. .......... 226/195

*Primary Examiner*—Leonard D. Christian
*Attorney*—Stevens, Davis, Miller & Mosher

ABSTRACT: An arrangement for regulating the tension of a tape passing between two spools such as in a magnetic tape recorder where a feeler element engages the tape adjacent each spool. The tension on each feeler element is controlled by a spring and the tension on this spring is controlled by an actuating element comprising an elongated bar which runs from one feeler element to the other and also has an extension which controls the drive means for the two spools.

INVENTORS
WOLF FREIHERR von HORNSTEIN
ALBERT LIEBL

BY Stevens, Davis, Miller & Mosher
ATTORNEYS

INVENTOR
WOLF FREIHERR von HORNSTEIN,
ALBERT LIEBL

BY Stevens, Davis, Miller & Mosher
ATTORNEYS

TAPE TENSION CONTROL SYSTEM WITH SENSING LEVERS, PARTICULARLY FOR MAGNETIC SOUND RECORDERS

The invention relates to a tape tension control system with sensing levers, particularly for magnetic sound recorders, and for several modes of tape feed, each sensing lever acting against a spring force which represents the desired value of tape tension.

It is well known to control the tape tension during all modes of tape feed in a magnetic sound recorder by means of sensing levers. Since different values of tape tension are desired for the various modes of tape feed, it is necessary to preset different desired values for its control. In prior art this is achieved in the following manner: in any of the modes of tape feed each sensing lever acts against a different spring, the forces of these springs being such that, in each case, the desired tape tension is obtained. For this reason, several springs of different force are required for each sensing lever. Due to the number of required springs, considerable expenditures are necessary for the actuating means by which these springs are actuated when the recorder is changed from one mode of tape feed to another.

It is an important object of this invention to provide a tape tension control system for all modes of tape feed in magnetic sound recorders, which is of uncomplicated construction and therefore inexpensive, and which avoids the shortcomings of the known systems.

According to the present invention this is achieved in that each sensing lever is held by a single spring whose second point of suspension, which is not located on the sensing lever, may be changed with respect to its position in order tp preset the different desired values of tape tension for the different modes of tape feed, such as, for example, "fast forward," "fast rewind," "normal tape feed" and "braking." Thus, only a single spring is required for each of the sensing levers and which spring, by being extended by different amounts, acts on the corresponding sensing lever with unequal forces which correspond to said different amounts of extension. Thus, the spring can preset the desired values of tape tension for all modes of tape feed.

In a preferred embodiment of the present invention the suspension points of both sensing lever springs are located on a rigid actuating element. Thus it becomes possible to alter the tensions of both springs simultaneously and commonly in such a manner that for both points in which the tape tension is controlled, i.e. at the takeup reel and at the payout reel, the proper value of tape tension for the respective mode of tape feed is preset. When the recorder is changed for another mode of tape feed, the tensions of both springs are simultaneously altered in such a manner that the tape tension which is necessary for the new mode of tape feed will appear.

According to a further embodiment of the invention the rigid actuating element actuates, directly or indirectly, the drive elements or the brakes respectively in the manner required for the respective mode of tape feed while it readjusts the sensing lever springs. It is, for example, advantageous to actuate the friction wheels, which drive the respective takeup clutch, by means of the rigid actuating element during "fast forward," "fast rewing" or "normal tape feed." Moreover, it is appropriate to simultaneously lift the brake from the respective takeup clutch by means of the actuating member. This is advantageous also if the brakes operate depending on the sense of rotation, i.e. if brake action is only performed when the tape is unwound; if not lifted they would slide on the respective takeup clutch which would not brake down the clutch but would result in unnecessary wear and soiling of the brakes.

The use of a rigid actuating element which provides for presetting of the desired value of tape tension for any selected mode of tape feed and which simultaneously provides for proper driving and braking of the respective tape winding clutches, not only makes the transport mechanism of the magnetic sound recorder less complicated but also guarantees uncomplicated manipulability. According to a preferred embodiment of the invention the actuating element is controlled by the "fast forward," "fast rewind" or "normal tape feed" controls respectively.

A preferred embodiment of the invention is shown in FIGS. 1, 2, 3 and 4 and is described below in detail. However, the invention is not limited to this embodiment.

Figure 1:
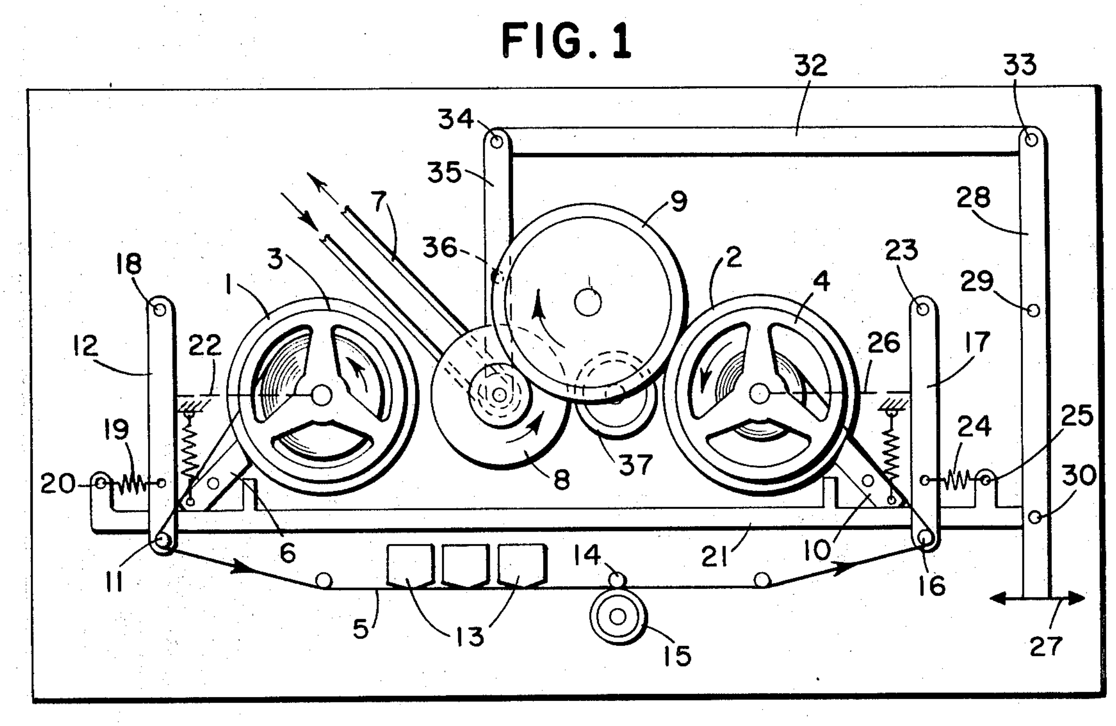
FIG. 1 shows a tape tension control system according to the invention in the "normal tape feed" mode of operation.

The reels 3 and 4 rest on the tape winding clutches 1 and 2. In case of "normal tape feed," i.e. the functions "recording" or "playback" respectively, as shown in FIG. 1, the tape winding clutch 1 which serves as the payout clutch, is restrained by the directional brake 6. The tape winding clutch 2 serves as the takeup clutch and is driven by the motor via a belt drive 7, a drive wheel 8 and a friction wheel 9. The brake 10 rests against the clutch 2. Its braking action can, however, be disregarded because it is also directional. The sound tape 5 is led past the magnetic heads 13 via the tape guide stud 11 of the sensing lever 12 and arrives at the reel 4, on which it is wound, via the capstan 14 with pressure roller 15 and the tape guide stud 16 of the sensing lever 17. The sensing lever 12 is supported in point 18 and is held by a spring 19, whose second point of suspension 20 is located on the rigid actuating element 21. The sensing lever 12 acts, via an intermediary member which may have the form of a lever, and whose positive direction is indicated by the line 22, on the tape winding clutch 1 and readjusts the brake torque of this clutch for the purpose of controlling the tape tension. The desired value of the tape tension at reel 3 is preset by the tension of spring 19. The sensing lever 17 is supported at point 23 and is held by a spring 24 whose second point of suspension 25 is also located on the rigid actuating element 21. The sensing lever 17 acts via an intermediary member, which may have the form of a lever and whose positive direction is indicated by the line 26, on the tape winding clutch 2 and influences the transmitted torque of this clutch in such a manner that a constant tape tension is established along the entire diameter of the tape roll on reel 4. The desired value of the tape tension at reel 4 is preset by the tension of spring 24.

During "normal tape feed" the position of the actuating element 21 is such that both springs 19 and 24 of the sensing levers 12 and 17 respectively are equally extended. Thus, the spring forces which act on the sensing levers 12 and 17, and therefore the desired values of the tape tensions at reels 3 and 4 respectively, are equal. This means that the tape tensions at both reels 3 and 4 are controlled to obtain equal values.

Figure 2:
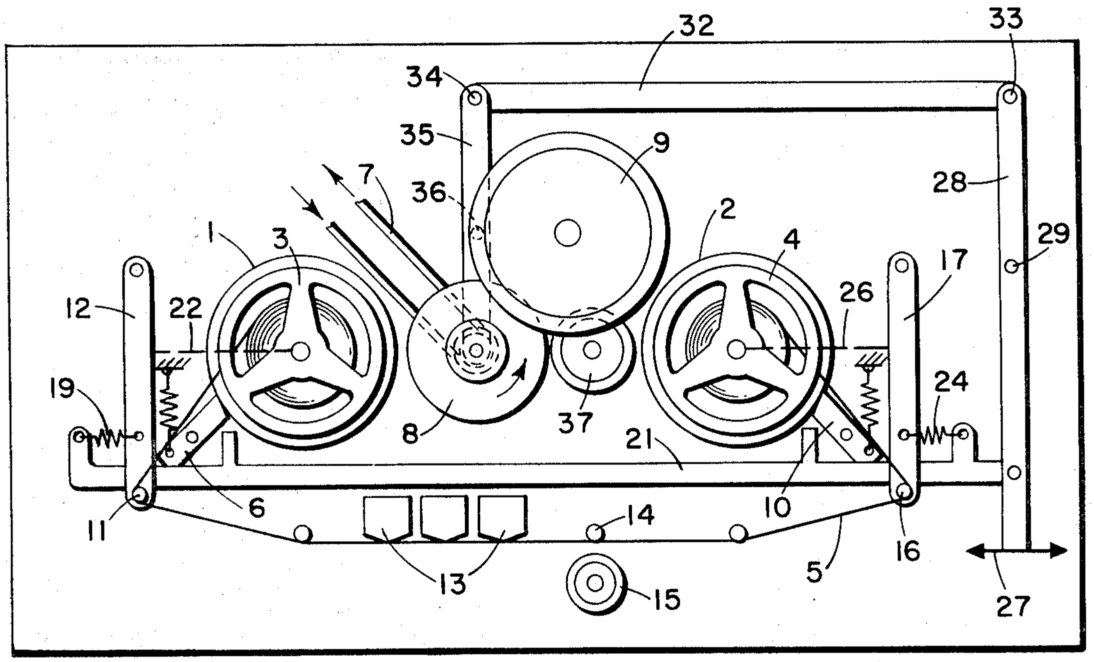
FIG. 2 represents the control system in the "stop" mode of the magnetic sound recorder.

If the recorder is changed from "normal tape feed" to the mode "stop," as shown in FIG. 2, the friction wheel 9 and the pressure roller 15 are disengaged. The actuating element 21 remains in the position which it had during "normal tape feed." This means that the tensions of the springs 19 and 24 are not altered. Thus, the sound tape is braked down while the desired tape tension is retained.

Figure 3:
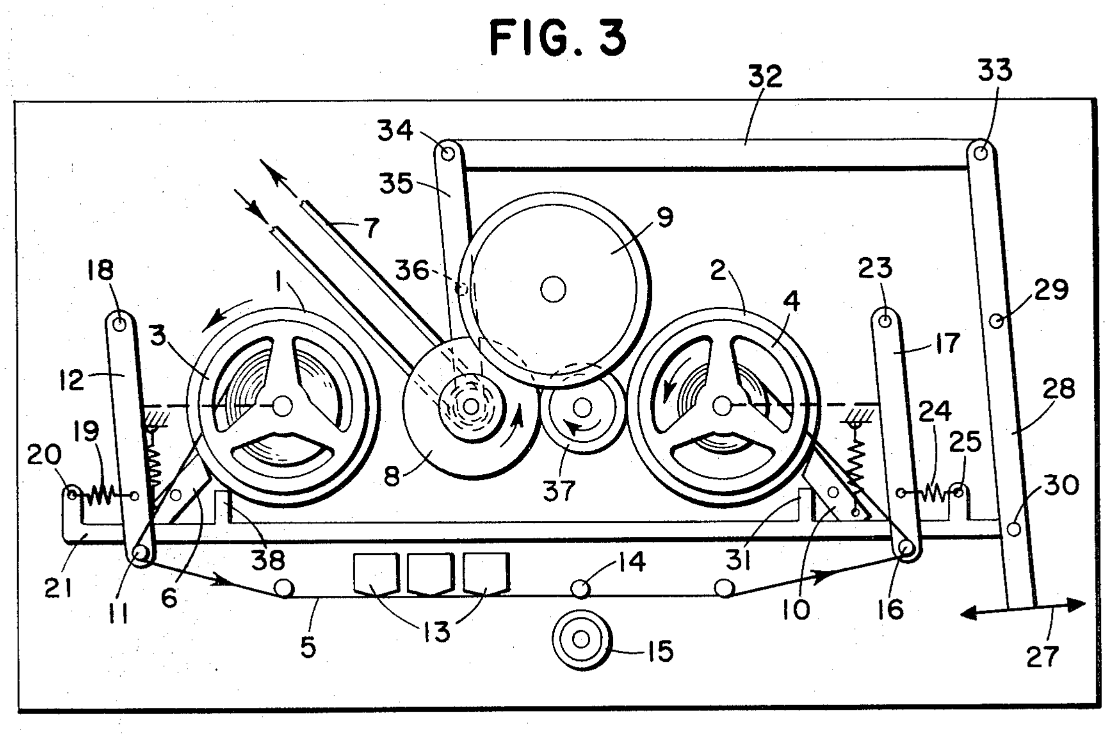
FIG. 3 shows the control system during "fast forward" and FIG. 4 during "fast rewind" of the sound tape.

When the recorder is changed from the mode "stop" to "-fast forward," as shown in FIG. 3, the operator moves the actuating element 21 to the right by means of the control device 27. The control device 27, which may have the form of a slider, is linked to an intermediary lever 28 which is pivoted at 29, the latter being a fixed point with respect to the recorder. Moreover, the intermediary lever 28 is supported at point 30 on the actuating element 21. When the actuating element 21 is slid to the right, the tension of the spring 19 and thus the desired value of the tape tension at reel 3 are decreased. The tension of the spring 24 is increased. This means that the transmitted torque of the tape winding clutch 2, which serves as the takeup clutch, is also increased. Simultaneously the actuating element 21 lifts, by means of the lip 31, the brake 10 of the tape winding clutch 2 and actuates, via the intermediary lever 28, a rod 32, which is supported at point 33 on the intermediary lever and at point 34 on a further lever 35. The lever 35 is pivoted at 36, a fixed point with respect to the recorder, and moves the drive wheel 8 to the right. Thus, the friction wheel 37 is pressed against the tape winding clutch 2 so as to drive this clutch with the rotational speed which is required for "fast forward." Since the pressure roller 15 is simultaneously lifted and since, moreover, the transmitted torque of the tape winding clutch 2 is greater than the brake torque of the tape winding clutch 1, the sound tape 5 is wound on the reel 4 under the tape tension which is preset by the spring 19. this tape tension remains constant along the entire diameter of the tape roll. The value of the transmitted torque of the tape winding clutch 2 is a function of the value of the tension of spring 24. This spring tension is so dimensioned that, when the recorder starts from standstill to "fast forward," no excessive starting jerk will act on the sound tape 5.

Figure 4:
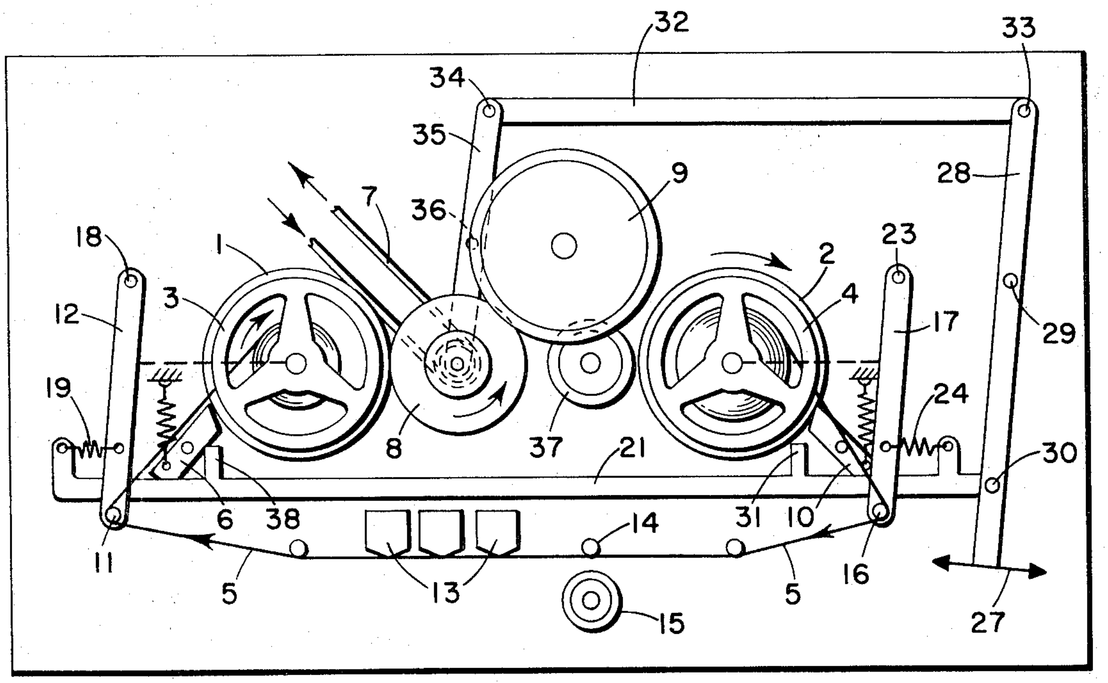

For "fast rewind" operation (this mode of operation of the control system is shown in FIG. 4) the actuating element 21 is slid to the left by means of the control device 27. The brake 6 of the tape winding clutch 1, which now serves as the takeup clutch, is lifted by the lip 38 of the actuating element 21.

Due to the actuating element being slid to the left, the spring 19 is being stretched more than for "normal tape feed" and the spring 24 is being stretched less. Simultaneously, the drive wheel 8 is being engaged to the tape winding clutch 1 by means of the intermediary lever 28, the rod 32 and the lever 35, thus driving said tape winding clutch 1. Since the pressure roller 15 is lifted and the transmitted torque of the tape winding clutch 1 is greater than the brake torque of the tape winding clutch 2, the sound tape 5 is wound on the reel 3 under the tape tension which is preset by the spring 24. This tape tension remains constant along the entire diameter of the tape roll. The value of the transmitted torque of the tape winding clutch 1 is a function of the value of the tension of spring 19. This spring tension is so dimensioned that, when the recorder starts from standstill to "fast rewind," no excessive starting jerk will act on the sound tape 5.

We claim:

1. Arrangement for regulating the tension of a tape passing between spools comprising:
   a. two spools for the takeup and supply of the tape;
   b. a moveable feeler element associated with each spool in engagement with the tape;
   c. a resilient biassing member associated with each said feeler element, one end of said biassing member being connected to the feeler element to which it is associated; and
   d. an elongated actuating element extending between said spools displaceable into a plurality of positions, the other end of each of said biassing members being connected to said actuating element so that preselected forces can be applied to said biassing members enabling different tape tensions for different tape travel functions to be established.

2. Arrangement for controlling the tension of a magnetic recording tape of a magnetic recorder in accordance with claim 1, in which said elongated actuating element can be displaced into three positions, the first of which corresponds to stop and normal travel, the second to fast reverse and the third to fast the of the magnetic tape.

3. An arrangement according to claim 2, in which:
   a. the first position is a central position of the actuating element wherein the forces and tensions of said biassing members are approximately equal;
   b. the second position is a position of the actuating element to a first side of the central position wherein the tension on the biassing element on said first side is reduced and that of the other biassing element is increased; and
   c. the third position is a position of the actuating element to a second side of said central position wherein the tension on the biassing element on said second side is reduced and that of the biassing element on said first side is increased.

4. Arrangement according to claim 1, in which the elongated actuating element consists of a bar the opposite ends of which are connected to said resilient biassing elements in the form of two springs.

5. Arrangement according to claim 1, in which an operating member is provided which is connected to the actuating element and to a drive means for the two spools so that the drive means is switched simultaneously with the displacement of the actuating element in accordance with the different tape travel functions of normal operation, fast reverse and fast forward.